March 30, 1954
C. B. RICHEY
2,673,504
MECHANISM FOR LIFTING FRONT MOUNTED IMPLEMENTS
Filed July 1, 1950
2 Sheets-Sheet 1
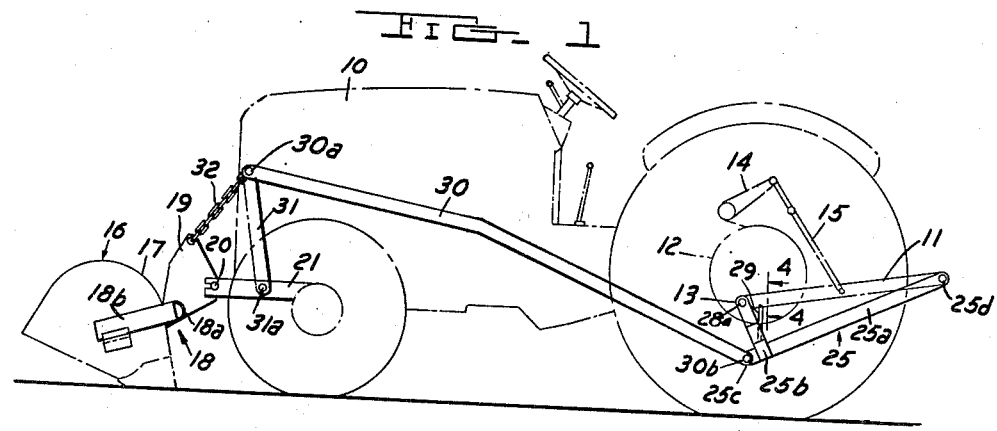
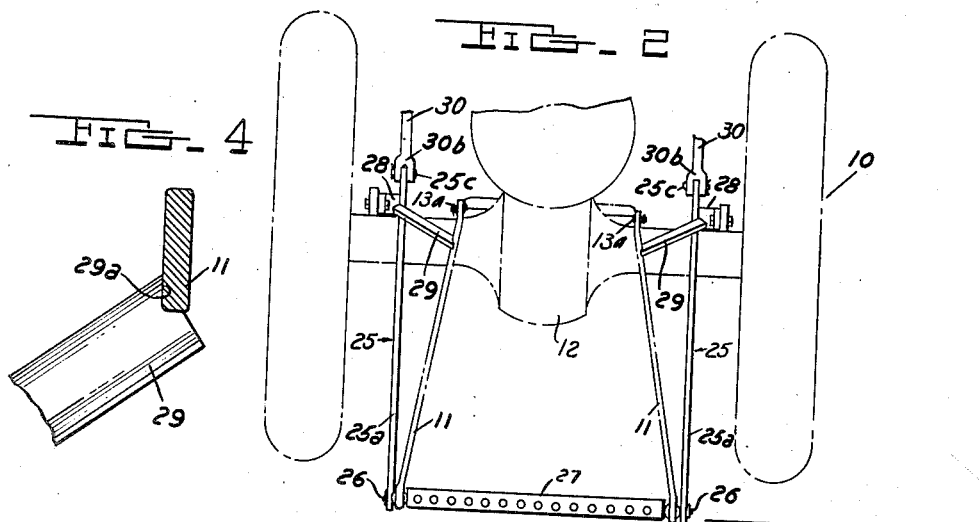
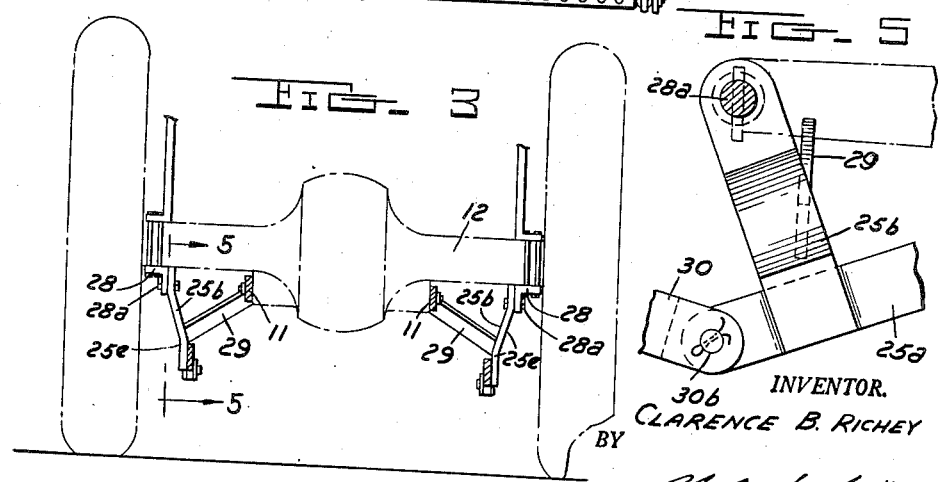
INVENTOR.
CLARENCE B. RICHEY
BY
ATTORNEY

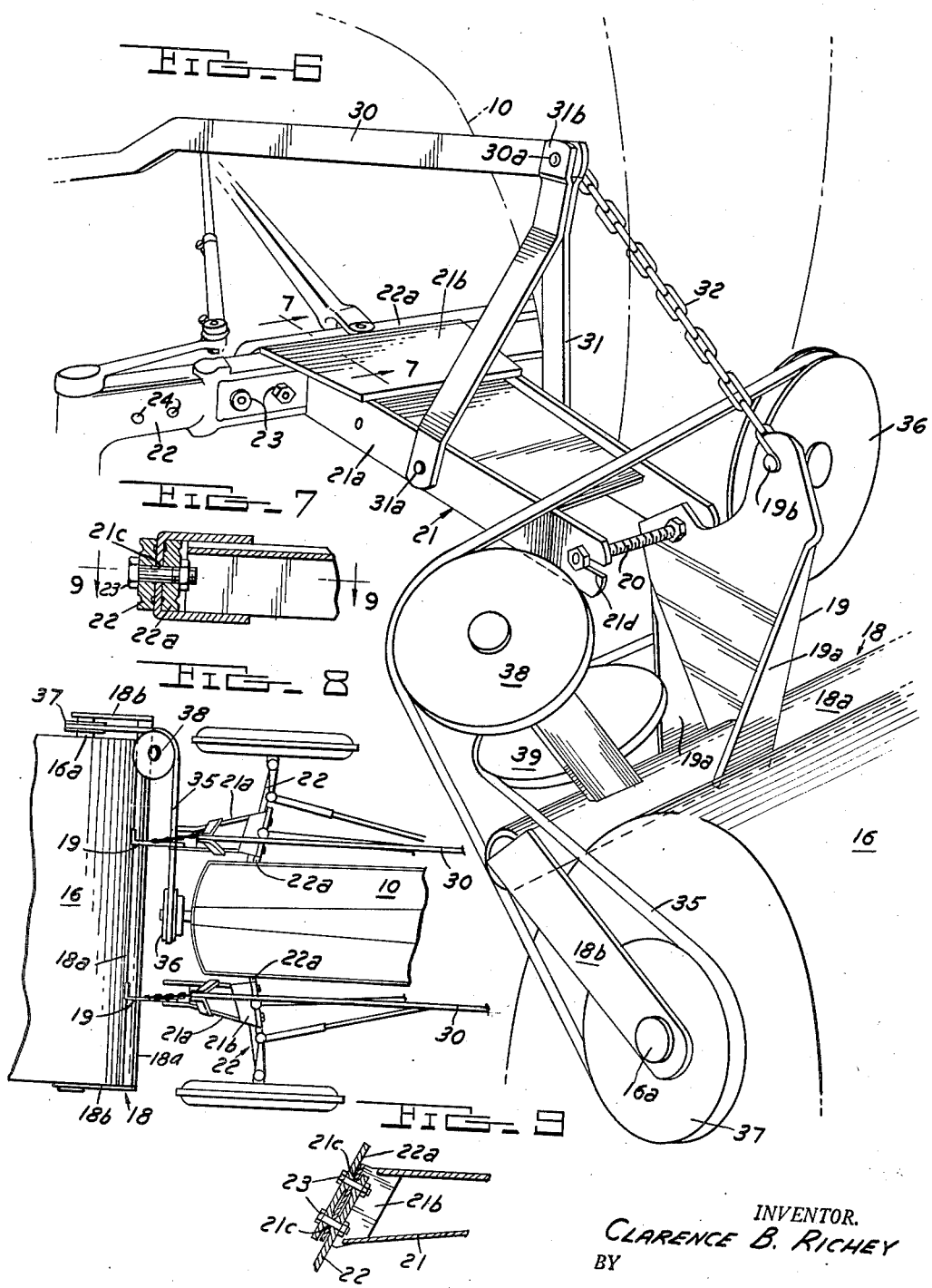

Patented Mar. 30, 1954

2,673,504

UNITED STATES PATENT OFFICE 2,673,504

MECHANISM FOR LIFTING FRONT MOUNTED IMPLEMENTS

Clarence B. Richey, Royal Oak, Mich., assignor, by mesne assignments, to Ford Motor Company, Dearborn, Mich., a corporation of Delaware Application July 1, 1950, Serial No. 171,733

2 Claims. (Cl. 97—46.01)

This invention relates to a device for use with the power-lifted trailing draft links of a well known type of tractor to permit the utilization of such links for lifting implements mounted on the front of such tractor.

It is frequently desirable to mount various implements on the front end of a tractor not only for ease in maneuvering such implements but also because such implements can only be properly operated in such position. With implements so mounted there arises the necessity for raising such implements from engagement with the ground to facilitate transportation of the implement to the working area and for adjusting the working height of the implement relative to the ground. While many of today's tractors are provided with rear mounted power operated lifting mechanisms for raising rear mounted implements, up to the present time it has been extremely awkward and impractical to utilize such power lifting mechanism for lifting or controlling the operation of front mounted implements.

Accordingly, it is an object of this invention to provide an improved mechanism for use with the power-lifted trailing draft links of a tractor for lifting and controlling front mounted implements.

Another object of this invention is to provide a device of simple construction which is readily mountable on the power-lifted trailing draft links of a tractor to permit convenient utilization of such power-lifted links for vertical control of front mounted implements.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view of a tractor showing the mechanism of this invention mounted on the trailing draft links of a tractor.

Fig. 2 is an enlarged fragmentary plan view of the device of Fig. 1.

Fig. 3 is a rear end view of the device of Fig. 2 shown partly in section.

Fig. 4 is an enlarged sectional view taken along the plane 4—4 of Fig. 1.

Fig. 5 is an enlarged cross sectional view taken along the plane 5—5 of Fig. 3.

Fig. 6 is an enlarged fragmentary perspective view of the tractor front end showing the bracket mounting on the front axle.

Fig. 7 is a sectional view taken along the plane 7—7 of Fig. 6.

Fig. 8 is a fragmentary plan view of the tractor front end.

Fig. 9 is a sectional view taken along the plane 9—9 of Fig. 7.

As shown on the drawings:

The implement lift mounting device of this invention is conveniently utilized with a tractor having a pair of vertically swingable, power lifted trailing draft links and such device comprises a pair of transversely spaced brackets which are respectively engageable with the trailing draft links at their rear ends and pivotally connected at their forward ends to the tractor. A linkage arrangement connects the forward ends of each bracket to an implement pivotally mounted at the front end of the tractor. A brace member also secured to the forward end of each bracket bears against the underside of the corresponding draft link to stabilize and align such brackets in substantial parallelism. Raising or lowering of the trailing draft links rotates each of the brackets concurrently so that the links attached to such brackets are moved in a substantially longitudinal direction to effect raising or lowering of the front mounted implement.

The lifting device of this invention will now be described in greater detail and is preferably utilized with a tractor 10 of well known make having a pair of trailing draft links 11 transversely spaced and pivoted to the axle housing 12 as at 13. The ends of draft links 11 incorporate the well known spherical type of bearings 13a in their pivotal mountings which permit limited lateral movement as well as vertical movement of such hitch links. Draft links 11 are vertically lifted by a pair of lift arms 14 journaled in the tractor frame. Lift arms 14 are rotated by a built-in hydraulically operated ram (not shown). Lift arms 14 are connected to draft links 11 by tie rods 15, thus upward rotation of lift arms 14 effects a corresponding rotation of draft links 11.

In Fig. 1 there is shown a stalk shredder 16 mounted on the front of tractor 10. Obviously, other types of implements can be mounted on the front of the tractor but such an implement is chosen to best illustrate the workings of this invention as the front mounting is generally preferred for optimum performance of such implement. Stalk shredder 16 operates under a shield 17 and such shield is supported by a frame 18 of generally U-shaped configuration comprising a tubular bight portion 18a and side arm members 18b. The forward ends of arm members 18b respectively journal the ends of a transverse shaft 16a projecting beyond the sides of shield 17. Shaft 16a carries a stalk shredding rotor (not shown). A pair of transversely spaced plate-like members 19 of substantially triangular configuration are welded to bight portion 18a of U-frame 18. Transverse mounting bolts 20 respectively pivotally secure plates 19 (as shown in Figs. 1 and 6) to a pair of brackets 21 secured to the front end of tractor 10 to permit limited transverse adjustment of the implement relative to the tractor. Plates 19 are provided with stiffening webs 19a and a transverse bolt 19b is provided in the upper apex thereof for a purpose to be later described.

Each bracket 21 is of substantially I-beam construction and is provided with rearwardly and outwardly flared vertical sides 21a as shown in Figs. 6 and 8. A foot portion 21b comprising essentially a U-shaped member is welded to the end of bracket 21a in such fashion that the foot will be angularly disposed, as best shown in Fig. 8. Foot 21b is provided with a pair of transversely spaced apertures 21c in its bight portion through which bolts 23 may be inserted to secure the foot to front axle 22 of tractor 10 as will now be explained.

As is well known, axle 22 is adjustable transversely whereby a greater or lesser spacing of the front wheels may be conveniently obtained. Accordingly, the portions of axle 22 supporting the front wheels of the tractor are made separable from the main axle portion 22a. Each axle portion 22 is secured to main portion 22a by a pair of bolts 23 insertable in a selected pair of a plurality of spaced holes 24 provided in each axle portion 22a which are selectively alignable with correspondingly spaced holes in main axle portion 22a for changing the spacing between the wheels. The bight portion of foot 21b is placed between the two axle portions 22 and 22a as shown in Figs. 6, 7, 8, and 9. Bolts 23 then pass through the transverse holes 21c provided in foot 21b to secure such foot in clamped relationship between axle portions 22 and 22a. A longitudinally extending slot 21d is provided in the forward end of each bracket 21 to pivotally support pins 20 as will be later described. Shaft 16a is power driven by a belt 35 from a front power-take-off pulley 36 suitably connected to the tractor motor crank shaft. Such belt is directed around a pulley 37 secured to one end of shaft 16a by a pair of idler pulleys 38 and 39. This arrangement is fully described and claimed in a pending application for driving system for a vehicle mounted implement, Serial No. 106,363 (now abandoned) filed July 23, 1949 in the name of F. D. Sawyer and assigned to the assignee of this application.

In order to utilize draft links 11 for raising stalk shredder 16 a substantially L-shaped mounting device or bracket 25 is mounted on each of such draft links. Each bracket 25 comprises a base member or lever arm 25a and an upright leg member 25b perpendicularly secured as by welding to the forward end of lever arm 25a and a transverse hole 25d is provided in the rear end of lever arm 25a. The rearwardly disposed hole 25d permits mounting of lever arms 25a on pins 26 respectively projecting from each end of a drawbar 27 on which the tractor draft links 11 are first mounted (Figs. 1 and 2). Leg members 25b are laterally offset as shown at 25e in Fig. 3 to permit mounting of such leg members on the usual depending stabilizer bar brackets 28 respectively provided on the tractor axle housing 12 adjacent the rear wheels as shown in Fig. 3. Each leg member 25b is pivotally secured to the corresponding bracket 28 by a transverse bolt 28a.

A thrust arm 29 is welded to each leg member 25b as shown in Figs. 2, 3 and 5 to contact the forward ends of draft links 11. Each thrust arm is angularly disposed on the leg members 25b as best shown in Fig. 3 and a notch 29a (Fig. 4) is provided in the upper end of each of such thrust arms which engages the underside of each draft link 11 for a purpose to be later explained.

Connection between bracket 25 and plate 19 of corn stalk shredder 16 is effected by a pair of longitudinal forwardly extending bar-like link members 30. The forward end of each link 30 is pivotally connected at 30a to an upstanding, inverted Y-shaped member 31. The lower ends of the inverted Y-shaped member 31 are pivotally secured on opposite sides of each bracket 31 by a bolt 31a. A fork member 31b is provided at the top of Y-shaped member 31 and link 30 is pivotally supported within forked portion 31b by a bolt 30a. A chain 32 having its ends respectively mounted on bolts 30a and 19b connects the upper end of Y-shaped member 31 to the upper apex of plate 30. Links 30 are provided with forked rear ends 30b which are respectively pivotally secured to the forward ends of arms 25a by transverse pins 25c.

Operation

In Fig. 1, stalk shredder 16 is shown in its operating position where it rests substantially on the ground. When it is desired to raise such stalk shredder to a non-working position, draft links 11 are raised by manipulation of the hydraulic control lever (not shown). As draft links 11 are raised vertically, brackets 25 are rotated in a counter-clockwise direction. Lever arm 25a being spaced downwardly from pivot point 13 of hitch links 11 by leg member 25b likewise describes an arc in a counterclockwise direction. As the rear ends of links 30 are pivotally connected to the end of arms 25a as shown at 30b, links 30 will be pulled rearwardly. Rearward movement of links 30 will then rotate Y-members 31 in a clockwise direction whereupon plate members 19 and hence corn stalk shredder 16 is rotated upwardly in a clockwise direction. Thus the corn stalk shredder 16 may be substantially elevated above the ground. The stalk shredder is conveniently lowered into working position by release of the pressured hydraulic fluid acting on the lift arms 14 to thereby permit the stalk shredder to lower by gravity to the desired working height. The thrust arms 29 being respectively fixed at their lower ends to lever arms 25a near the pivot point of such arms bear against draft links 11 to prevent the lateral movement of such links which is normally possible due to the use of the spherical bearings 13a utilized for mounting such links in the tractor. Hence thrust arms 29 laterally stabilize brackets 25 by minimizing lateral movement of hitch links 11.

It will thus appear that there is here provided a mechanism for use with the power lifted draft links of a tractor which conveniently permits the vertical control of an implement mounted on the front of the tractor. Such an arrangement is of relatively simple and inexpensive, yet rugged construction. In addition, the operation of front mounted implements is greatly facilitated.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced, power-lifted, universally pivoted, trailing hitch links and an implement pivotally mounted on the tractor, a pair of levers adapted for pivotal mounting on the tractor in depending relationship and having their pivot points respectively laterally spaced outwardly from the pivot points of said hitch links, means for respectively connecting the free ends of said levers and said hitch links, means for operatively connecting said levers to the implement, whereby the implement is pivoted as the hitch links are raised or lowered, and a pair of laterally inwardly projecting struts respectively rigidly secured to said levers and having end portions abutting said hitch links, thereby imparting opposed lateral stabilizing forces to the hitch links.

2. For use with a tractor having a pair of laterally spaced, power-lifted, universally pivoted, trailing hitch links and an implement pivotally mounted on the tractor for vertical movement, a pair of bracket members respectively adaptable for connection to the hitch links in depending relationship, each of said bracket members comprising a first and second arm joined in substantially L-shaped configuration, said first arm being adapted for pivotal mounting on the tractor in substantial alignment with the pivot axis of the respective hitch link and being laterally spaced therefrom, said second arm being adapted for securement to the free end of the respective hitch link, means for operatively connecting said bracket members to the implement, whereby the implement is raised or lowered as the hitch links are raised or lowered, and a laterally projecting strut member rigidly secured to each of said bracket members, each strut member having a notch in the free end thereof for engagement with the respective hitch link to transversely stabilize said hitch links.

CLARENCE B. RICHEY.

References Cited in the file of this patent
UNITED STATES PATENTS

| Number | Name | Date |
|---|---|---|
| 1,659,879 | Karras | Feb. 21, 1928 |
| 1,706,606 | Harkness | Mar. 26, 1929 |
| 1,929,804 | Brown | Oct. 10, 1933 |
| 2,228,490 | Smith | Jan. 14, 1941 |
| 2,359,206 | Currie | Sept. 26, 1944 |
| 2,390,767 | Alderman | Dec. 11, 1945 |
| 2,409,228 | Silver | Oct. 15, 1946 |
| 2,558,123 | Brown et al. | June 26, 1951 |
| 2,561,650 | Carlson | July 24, 1951 |